W. STINE.
Stovepipe.
No. 69,506.  Patented Oct. 1, 1867.
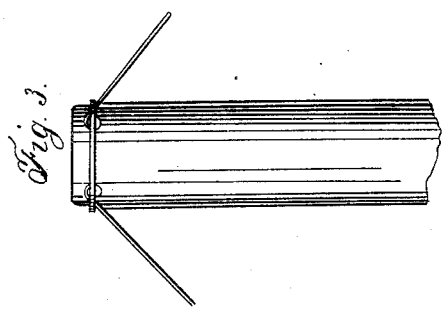
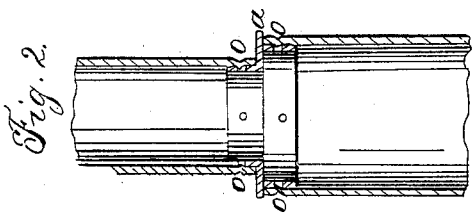 
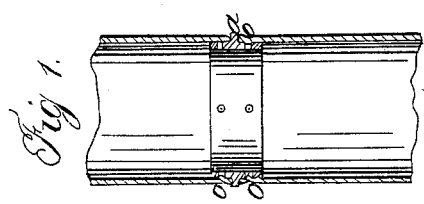 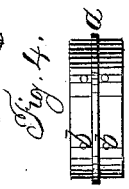
Witnesses:
Theo Tusch
J A Servus
Inventor,
William Stine
Per Munn & Co
Attorneys

United States Patent Office.

WILLIAM STINE, OF ELMORE, OHIO.

Letters Patent No. 69,506, dated October 1, 1867.

STOVE-PIPE JOINT.

The Schedule referred to in these Letters Patent and making part of the same.

TO ALL WHOM IT MAY CONCERN:

Be it known that I, WILLIAM STINE, of Elmore, in the county of Ottawa, and State of Ohio, have invented a new and useful Improvement in Stove-Pipe and Smoke-Stack Joints; and I do hereby declare that the following is a full, clear, and exact description thereof, which will enable others skilled in the art to make and use the same, reference being had to the accompanying drawings, forming part of this specification.

The object of my invention is to improve the manner in which stove pipe, smoke-stacks, &c., are usually joined together, and to facilitate the operation of putting them up and taking them down; and the invention consists in providing a ring, with a flange or rib around its outer side or circumference, which acts as a stop to the pipe, the ends of the ring being inserted within the pipe; and also in a device to fasten the pipe to the ring, as will hereinafter appear.

Figure 1 represents a vertical section of two pieces of pipe joined by my method.

Figure 2 represents a vertical section of two pieces of pipe of different diameters joined together.

Figure 3 shows the top of a smoke-stack with one of my rings at the top with eyelets in the flange for guys, and with the guys attached.

Figure 4 shows the outside view of the ring used in fig. 1; and

Figure 5 is an outside view of the ring used in fig. 2.

Similar letters of reference indicate like parts.

The rings are formed as represented in figs. 4 and 5, fig. 4 being a short section of a cylinder, with a narrow flange or rib, *a*, around it. Fig. 5 is formed in the same manner, only the ends are of different diameters. These rings are simply slipped into the pipe up to the rib, as represented in figs. 1 and 2. The ends of the two pieces of pipe rest on the rib. It will be noticed that there are holes *b* through the sides of the rings. These holes are for fastening the pipe and the ring together when it is desired to do so, and when long lengths of horizontal pipe are needed, and for other purposes. This fastening is done by indenting the pipe opposite these holes, thus forcing a portion of the iron into the holes, as seen in the drawing at *o*. But screws or rivets or nails may be used instead of the indentations described. This joint prevents stove-pipe as well as smoke-stack joints from slipping together, and thus becoming displaced by the weight of the pipe above. The pipe requires no previous preparation for the ring, and the pieces are available their whole length, as they do not lap as in the usual way. In fastening the pipe together the position of the holes in the rings is indicated by notches or marks on the rib.

Having thus described my invention, what I claim as new, and desire to secure by Letters Patent, is—

The perforated metallic ring for securing the joints of stove pipes and smoke-stacks, provided with the central flange *a* around its periphery, when constructed as described, with the ends upon both sides of the flange *a* of equal or of unequal diameters, substantially as herein shown and described.

WM. STINE.

Witnesses:
L. B. MYERS,
JOSHUA KEATING.